(12) United States Patent
Su (10) Patent No.: US 8,184,542 B2
(45) Date of Patent: May 22, 2012

(54) METHODS, COMPUTER PROGRAMS, AND SYSTEMS FOR VERIFYING A CUSTOMER PREMISES CONNECTION TO AN INTEGRATED COMMUNICATION SYSTEM

(75) Inventor: Jie Su, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1897 days.

(21) Appl. No.: 11/298,180

(22) Filed: Dec. 8, 2005

(65) Prior Publication Data

US 2007/0133422 A1 Jun. 14, 2007

(51) Int. Cl.
*H04J 1/16* (2006.01)
*G01R 31/08* (2006.01)

(52) U.S. Cl. .......... 370/241; 370/248; 370/252; 714/43; 714/716; 714/807; 455/416; 455/445; 455/450

(58) Field of Classification Search .................. 370/241, 370/248, 252, 224, 249, 389, 216, 349, 466; 725/124; 709/230; 707/100; 714/43, 716, 714/47, 807; 348/627, 192; 382/262; 455/416, 455/445, 450, 41.2

See application file for complete search history.

(56) References Cited

U.S. PATENT DOCUMENTS

| | | | |
|---|---|---|---|
| 5,181,106 A | 1/1993 | Sutherland | 358/86 |
| 5,189,673 A | 2/1993 | Burton et al. | 370/110.1 |
| 5,301,050 A | 4/1994 | Czerwiec et al. | 395/110 |
| 5,303,229 A | 4/1994 | Withers et al. | 370/58.1 |
| 5,512,936 A | 4/1996 | Burton et al. | 348/11 |
| 5,572,347 A | 11/1996 | Burton et al. | 359/124 |
| 5,576,874 A | 11/1996 | Czerwiec et al. | 359/123 |
| 5,594,576 A | 1/1997 | Sutherland et al. | 359/118 |
| 5,687,014 A | 11/1997 | Czerwiec et al. | 359/123 |
| 6,950,968 B1 * | 9/2005 | Parolari et al. | 714/43 |
| 7,187,670 B2 * | 3/2007 | Hein-Magnussen et al. | 370/349 |
| 7,359,772 B2 * | 4/2008 | Paturi et al. | 701/29 |
| 2004/0183950 A1 * | 9/2004 | Sugimoto et al. | 348/627 |
| 2004/0264382 A1 * | 12/2004 | Lackshminarasimha et al. | 370/252 |
| 2005/0083835 A1 * | 4/2005 | Prairie et al. | 370/224 |
| 2006/0126495 A1 * | 6/2006 | Guichard et al. | 370/216 |
| 2007/0047448 A1 * | 3/2007 | Chiu et al. | 370/241 |

\* cited by examiner

*Primary Examiner* — Kwang B Yao
*Assistant Examiner* — Jamal Javaid
(74) *Attorney, Agent, or Firm* — Cantor Colburn LLP (57) ABSTRACT

Verifying a customer premises connection to a communication system having a plurality of ports, each of which serves a corresponding customer premises. A known quantity of data is transmitted to an address corresponding to a specific customer premises. A quantity of data received at a first trial port of the plurality of ports is monitored. If the known quantity of data matches the monitored quantity of data received at the first trial port, then the customer premises connection to the first trial port is thereby verified. If the known quantity of data does not match the monitored quantity of data received at the first trial port, then quantity of data received at a second trial port of the plurality of ports is monitored and, if the known quantity of data matches the monitored quantity of data received at the second trial port, then the customer premises connection to the second trial port is thereby verified.

26 Claims, 8 Drawing Sheets

| Unverified Information Table | 401 |
|---|---|
| Customer ID | 363373 |
| Customer Phone Number | 413-454-4888 |
| Service Order Number | 23323 |
| ONU Assignment | First ONU 134 |
| Unverified ONU Port Assignment | Third Port 123 |

*FIG. 4*

| Verified Information Table | 501 |
|---|---|
| Customer ID | 363373 |
| Customer Phone Number | 413-454-4888 |
| Date | October 24 2005 |
| Status | |
| ONU Assignment | First ONU 134 |
| Unverified ONU Port Assignment | Fifth Port 125 |

*FIG. 5*

METHODS, COMPUTER PROGRAMS, AND SYSTEMS FOR VERIFYING A CUSTOMER PREMISES CONNECTION TO AN INTEGRATED COMMUNICATION SYSTEM

BACKGROUND

The present invention relates generally to communications, and more particularly, to communications over integrated fiber in the loop systems.

Integrated fiber in the loop (IFITL) and fiber to the curb (FTTC) are terms used to describe installation of fiber optic cables from a telephone switch to within 1,000 feet of a home or enterprise. In a typical installation, fiber optic cables extend from the telephone switch to an equipment pedestal that serves a small number of homes. From the equipment pedestal, digital TV is delivered to the home using coaxial cable, whereas voice and data are delivered to the home using twisted pair cabling. This data, sometimes referred to as PCDATA, is delivered over a high-speed connection, illustratively 1.544 MB/s downstream and 256 KB/s upstream, between a customer premises and an ISP (Internet Service Provider). The physical interface to the customer premises is a standard twisted-pair Ethernet connection, illustratively using 10 Base T Ethernet with a local area network (LAN) speed of 10 MB/s.

Figure 1:
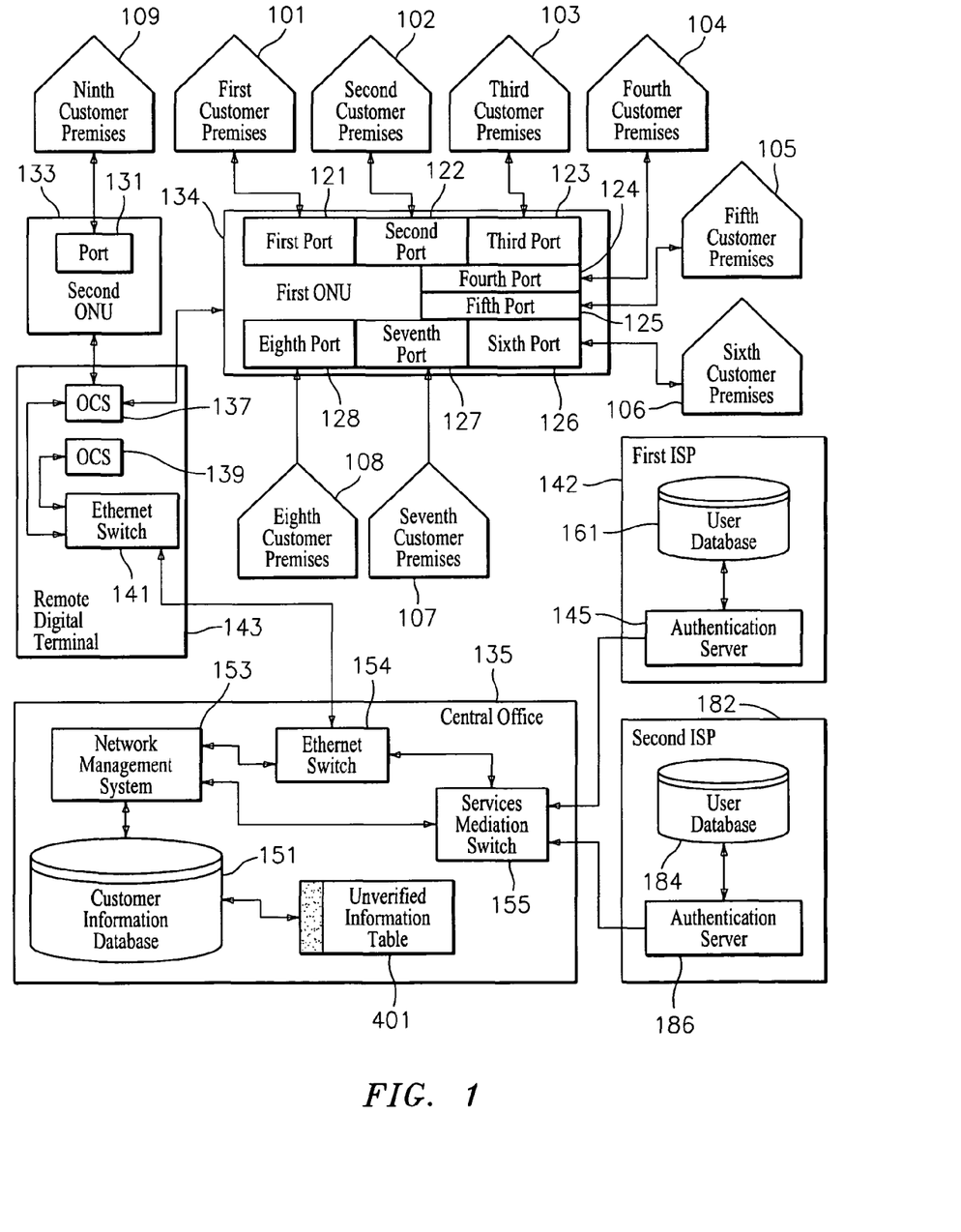
FIG. 1 is a block diagram showing a conventional integrated fiber in the loop (IFITL) system.

FIG. 1 is a block diagram showing a conventional integrated fiber in the loop (IFITL) system. A first optical network unit (ONU) 134 contains a plurality of ports, such as first, second, third, fourth, fifth, sixth, seventh, and eighth ports 121-128, respectively. A first customer premises 101 is connected to first port 121, illustratively using twisted-pair Category 5 Ethernet cable. Likewise, a second customer premises 102 is connected to second port 122; a third customer premises 103 is connected to third port 123; a fourth customer premises 104 is connected to fourth port 124; a fifth customer premises 105 is connected to fifth port 125; a sixth customer premises 106 is connected to sixth port 126; a seventh customer premises 107 is connected to seventh port 127; and an eighth customer premises 108 is connected to eighth port 128. A typical ONU, such as first ONU 134, includes eight ports. Accordingly, if a large number of customer premises are to be served, additional ONUs may be employed. For example, a ninth customer premises 109 is served by a port 131 of a second ONU 133. The structure, functionality, and implementation of first ONU 134 and second ONU 133 are matters well within the knowledge of those having ordinary skill in the relevant art.

Data from up to eight ONUs, including first and second ONUs 134, 133, are multiplexed by an optical channel shelf (OCS) 137 of a remote digital terminal (RDT) 143. RDT 143 combines the output of OCS 137, in the form of an Ethernet 10 Base T data stream, with the outputs of other OCS's (such as OCS 139) at an Ethernet switch 141, to generate an Ethernet 100 Base F data stream. Ethernet switch 141 of RDT 143 delivers the 100 Base F data stream over fiber optic cable to an Ethernet switch 154 at a telephone company central office 135. Ethernet switch 154 further combines the 100 Base F data streams from a plurality of RDTs (including RDT 143) to generate a single 100 Base T data stream which is fed to a services mediation switch 155. The structure, functionality, and implementation of RDT 143, OCS 137, OCS 139, Ethernet switch 141, Ethernet switch 154, and services mediation switch 155 are matters well within the knowledge of those having ordinary skill in the relevant art.

Services mediation switch 155 is in communication with one or more authentication servers 145, 186 at one or more ISPs, such as first ISP 142 and second ISP 182. First ISP 142 maintains a user database 161, and second ISP 182 maintains a user database 184. User databases 161 and 182 include information associating each of a plurality of customer phone numbers with corresponding customer IDs, as well as information associating each of a plurality of customer IDs with corresponding customer IP addresses. A network management system 153 manages network resources such as first ONU 134, second ONU 133, RDT 143, Ethernet switch 154, and services mediation switch 155. One function of network management system 153 is to keep track of the manner in which network resources are provisioned or allocated to customers. Information pertaining to the allocation of network resources is stored in a customer information database 151. The structure, functionality, and implementation of authentication servers 145, 186, first ISP 142, second ISP 182, user databases 161, 184, network management system 153, and customer information database 151 are matters well within the knowledge of those having ordinary skill in the relevant art.

Figure 4:
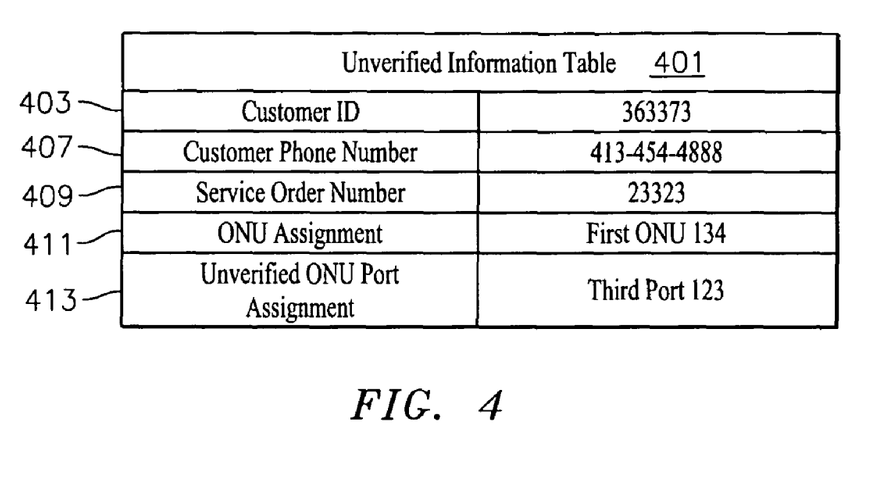
FIG. 4 is a data structure diagram setting forth an unverified information table for use with the methods of FIGS. 3A-3E.

When IFITL service was first offered, no mechanism was in place by which particular ONU ports (such as first port 121 and second port 122) could be pre-provisioned for use by specific customers. As a practical matter, all ONU ports 121-128 were enabled so that, when a new customer wished to receive IFITL service, a field technician could connect the customer to any enabled port not already being used by another customer. Customer information database 151 was loaded with an unverified information table 401 associating each of a plurality of customer premises with a corresponding ONU assignment and a corresponding unverified ONU port assignment. This assignment is referred to as an unverified port assignment because the particular ONU port used by a specific customer premises was not always accurately recorded in customer information database 151. For example, unverified information table 401 may correctly specify that third customer premises 103 is using first ONU 134, but this table might erroneously indicate that third customer premises 103 is assigned to eighth port 128, not third port 123.

The practice of not accurately recording customer ONU port assignments has adverse consequences when an order is received to disconnect a customer. Using information recorded in customer information database 151, the wrong customer premises may be disconnected from IFITL service, possibly inconveniencing a paying customer while allowing a delinquent customer continued access. Further to the example presented in the immediately preceding paragraph, if a disconnect order is received to disconnect third customer premises 103, eighth port 128 is disabled because customer list for first ONU 157 erroneously indicates that eighth port 128 is assigned to third customer premises 103. However, disabling eighth port 128 disconnects IFITL service to eighth customer premises 108, and not to third customer premises 103. Accordingly, what is needed is a technique for accurately matching a customer premises with an ONU port accessed at that customer premises.

BRIEF SUMMARY

Embodiments include methods for verifying a customer premises connection to a communication system having a plurality of ports, each of which serves a corresponding customer premises. These methods comprise transmitting a known quantity of data to an address corresponding to a specific customer premises, and monitoring a quantity of data received at a first trial port of the plurality of ports. If the known quantity of data matches the monitored quantity of data received at the first trial port, then the customer premises connection to the first trial port is thereby verified. If the known quantity of data does not match the monitored quantity of data received at the first trial port, then a quantity of data received at a second trial port of the plurality of ports is monitored. If the known quantity of data matches the monitored quantity of data received at the second trial port, then the customer premises connection to the second trial port is thereby verified.

These methods can also be viewed as providing computer program products for establishing a trusted network. The computer program products include a storage medium readable by a processing circuit and storing instructions for execution by the processing circuit for facilitating a method of verifying a customer premises connection to a communication system having a plurality of ports, each of which serves a corresponding customer premises. The method comprises transmitting a known quantity of data to an address corresponding to a specific customer premises, and monitoring a quantity of data received at a first trial port of the plurality of ports. If the known quantity of data matches the monitored quantity of data received at the first trial port, then the customer premises connection to the first trial port is thereby verified. If the known quantity of data does not match the monitored quantity of data received at the first trial port, then a quantity of data received at a second trial port of the plurality of ports is monitored. If the known quantity of data matches the monitored quantity of data received at the second trial port, then the customer premises connection to the second trial port is thereby verified.

Embodiments also include a system for verifying a customer premises connection to a communication system having a plurality of ports, each of which serves a corresponding customer premises. The system comprises a transmission mechanism for transmitting a known quantity of data to an address corresponding to a specific customer premises; a monitoring mechanism for monitoring a quantity of data received at a first trial port of the plurality of ports; and a comparison mechanism for comparing the known quantity of data with the monitored quantity of data such that, if the known quantity of data matches the monitored quantity of data received at the first trial port, then the customer premises connection to the first trial port is thereby verified. If the known quantity of data does not match the monitored quantity of data received at the first trial port, then the monitoring mechanism is capable of monitoring quantity of data received at a second trial port of the plurality of ports. If the known quantity of data matches the monitored quantity of data received at the second trial port, then the customer premises connection to the second trial ONU port is thereby verified.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains exemplary embodiments of the invention, together with advantages and features, by way of example with reference to the drawings.

DETAILED DESCRIPTION OF EXEMPLARY EMBODIMENTS

Figure 2:
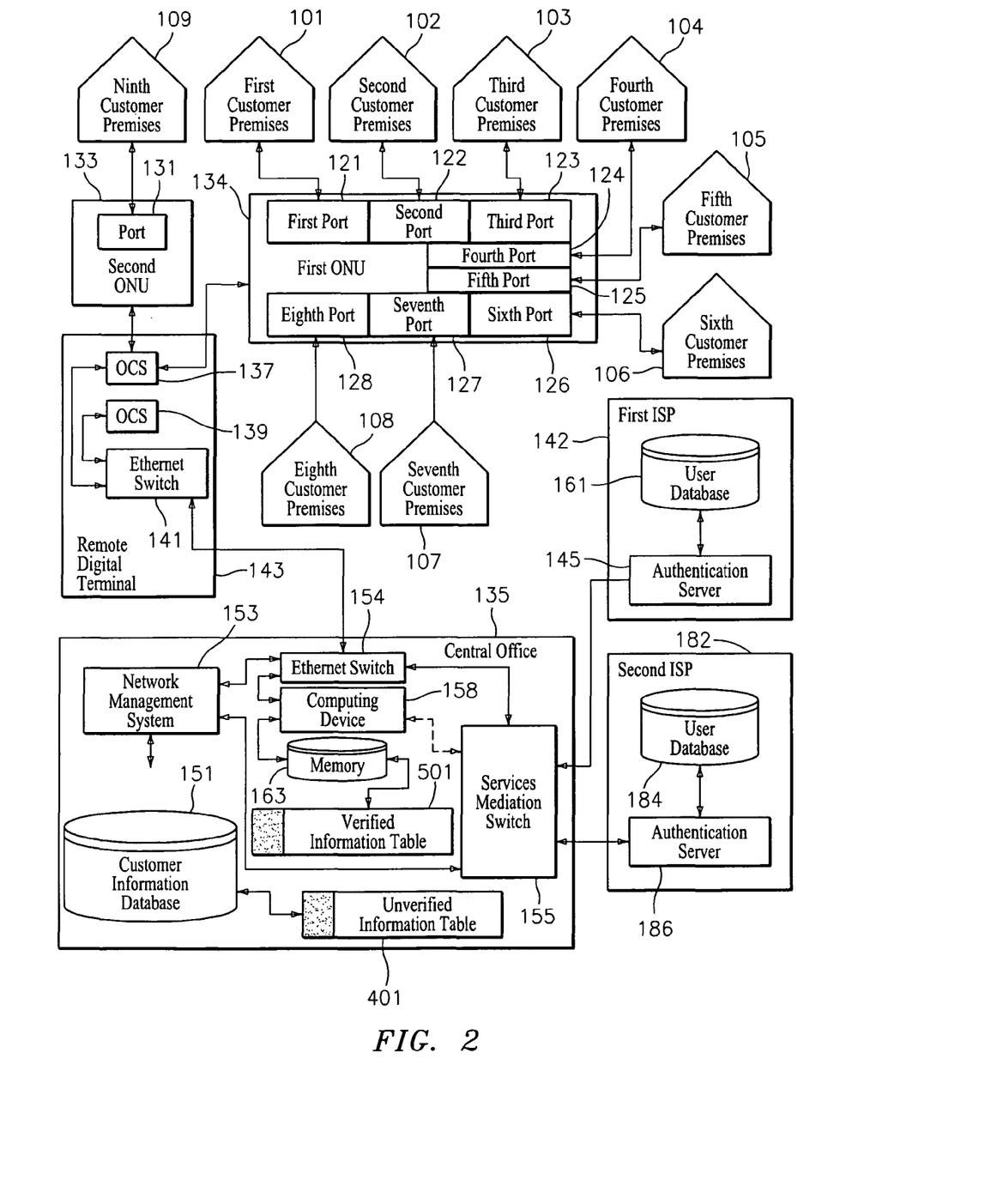
FIG. 2 is a block diagram showing an IFITL system constructed according to various illustrative embodiments.

FIG. 2 is a block diagram showing an IFITL system constructed according to various illustrative embodiments. The various elements of FIG. 2 are substantially similar to those already described in connection with FIG. 1, with the exception that the system of FIG. 2 includes a computing device 158 and memory 163 configured to implement a procedure for verifying a customer connection to the IFITL system. In order to implement this procedure, computing device 158 maintains a verified information table 501 in memory 163. According to an exemplary embodiment, a known quantity of data is transmitted to a specific customer premises, and the quantity of data received at a first trial ONU port of the IFITL system is monitored. Computing device 158 may, but need not, be implemented using a personal computer (PC), mainframe computer, workstation, laptop, palm pilot, wireless device, or microprocessor-based device. Memory 163 represents any computer-readable storage medium, such as semiconductor memory, optical memory, a CD-ROM, a disk drive, a floppy disk, magnetic tape, or various combinations thereof.

According to an exemplary embodiment, a first trial ONU port is assigned to a specific customer premises, at least according to potentially inaccurate information in unverified information table 401 stored in customer information database 151. Each of a plurality of customer premises is associated with a corresponding customer identifier. Unverified information table 401 associates each of a plurality of customer identifiers with a corresponding ONU and a corresponding ONU port assignment. For example, it may be desirable to identify a customer connection to the IFITL system from a third customer premises 103, wherein unverified information table 401 may indicate that third customer premises 103 is assigned to fifth port 125. In this example, the first trial ONU port would be fifth port 125.

Figure 5:
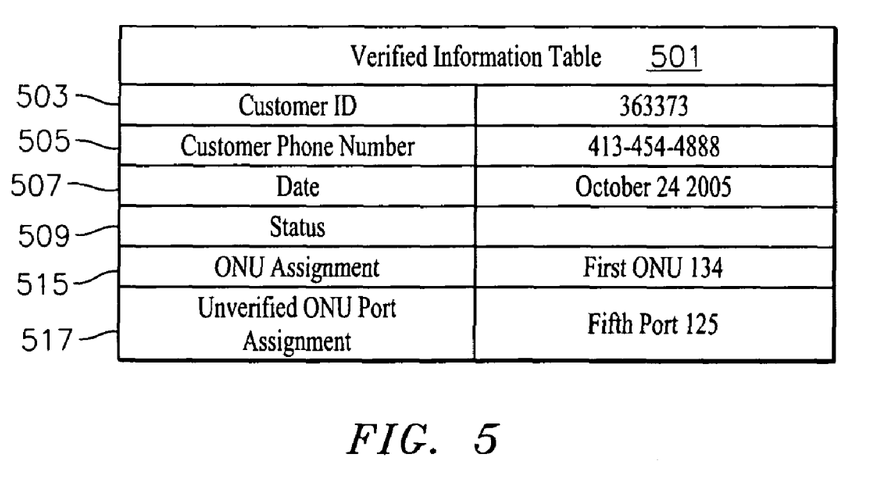
FIG. 5 is a data structure diagram setting forth a verified information table for use with the methods of FIGS. 3A-3E.

If the known quantity of data transmitted matches the quantity of data received at the first trial ONU port, then the customer connection to the IFITL system as recorded in unverified information table 401 is verified. In verified information table 501, a new record is generated or an existing record is modified that associates the customer identifier corresponding to the specific customer premises with the first trial ONU port. Otherwise, another ONU port of the ONU is used as an Nth trial port, where N is an integer between 2 and the maximum number of ports on the ONU, inclusive. According to an exemplary embodiment, computing device 158 transmits a known quantity of data to the specific customer premises and monitors the quantity of data received at the Nth trial port of the IFITL system. If the known quantity of data matches the quantity of data received at the Nth trial ONU port, then the Nth trial ONU port has been verified. A new record is generated or an existing record is modified in verified information table 501. The new or existing record associates the customer identifier corresponding to the specific customer premises with the Nth trial ONU port. Otherwise, another not yet monitored ONU port of the ONU is used as the Nth trial port and the foregoing procedure is repeated until a trial ONU port is verified or the last ONU port on the ONU is tested.

Figure 3A:
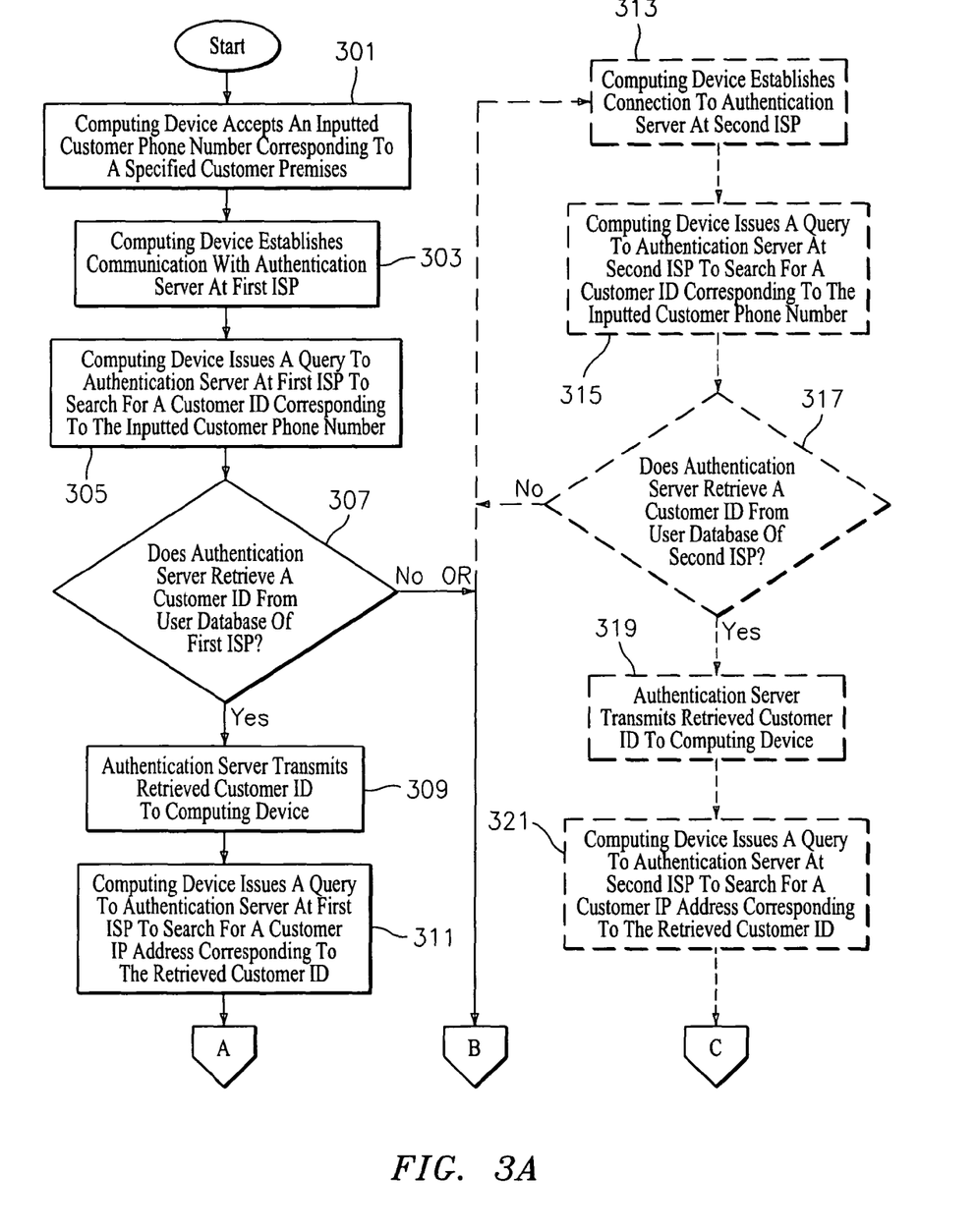
FIGS. 3A-3E together comprise a flowchart depicting methods for verifying a customer connection to an IFITL system according to various illustrative embodiments.

FIGS. 3A-3E together comprise a flowchart depicting methods for verifying a customer connection to an IFITL system according to various illustrative embodiments. The procedure commences at block 301 where computing device 158 (FIG. 2) accepts an inputted customer phone number corresponding to a specified customer premises. Next, at block 303 (FIG. 3A), the computing device establishes communication with authentication server 145 (FIG. 2) at first ISP 142. The computing device issues a query to the authentication server at the first ISP to search for a customer ID corresponding to the inputted customer phone number (FIG. 3A, block 305). At block 307, a test is performed to ascertain whether or not the authentication server retrieves a customer ID from user database 161 (FIG. 2) at the first ISP. If not, the program advances to block 331 (FIG. 3B) or, alternatively, to optional block 313 (FIG. 3A). At block 331, the computing device generates an error record indicating that the customer ID does not exist and places the generated error record into verified information table 501 (FIGS. 2 and 5). The program then terminates.

Figure 3B:
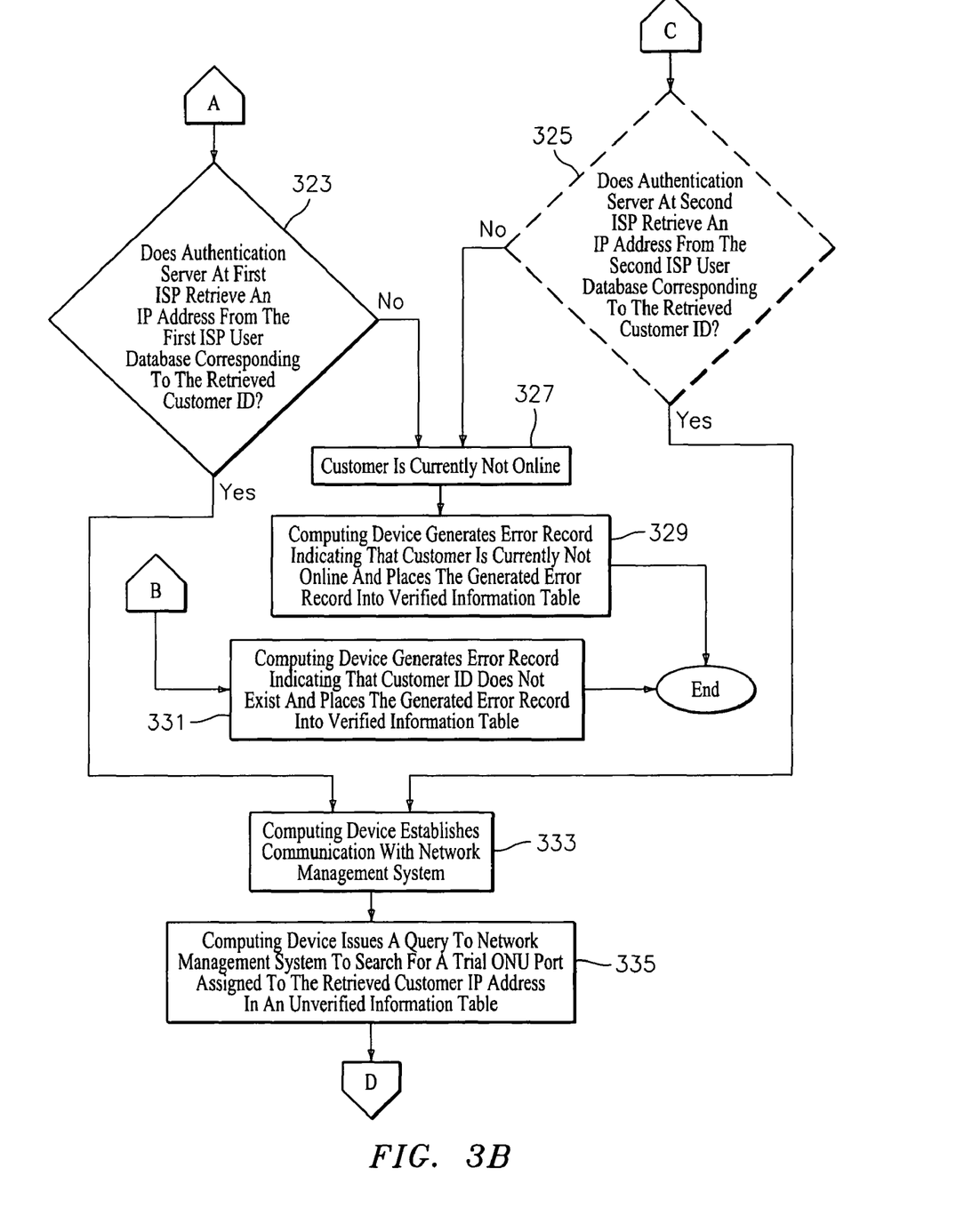

At optional block 313 (FIG. 3A), the computing device establishes a connection to authentication server 186 at second ISP 182 (FIG. 2). The computing device issues a query to the authentication server at the second ISP to search for a customer ID corresponding to the inputted customer phone number (FIG. 3A, block 315). At block 317, a test is performed to ascertain whether or not the authentication server retrieves a customer ID from the user database of the second ISP. If not, the program advances to block 331 (described above). The affirmative branch from block 317 leads to block 319 where the authentication server transmits the retrieved customer ID to the computing device. As shown in FIG. 3B, the computing device issues a query to the authentication server at the second ISP to search for a customer IP address corresponding to the retrieved customer ID (block 321). At block 325, a test is performed to ascertain whether or not the authentication server at the second ISP retrieves an IP address from the second ISP user database corresponding to the retrieved customer ID. If not, the program progresses to block 327, to be described hereinafter. The affirmative branch from block 325 leads to block 333, to be described hereinafter.

Referring again to FIG. 3A, the affirmative branch from block 307 leads to block 309 where the authentication server transmits the retrieved customer ID to the computing device. The computing device issues a query to the authentication server at the first ISP to search for a customer IP address corresponding to the retrieved customer ID (block 311). A test is performed at block 323 (FIG. 3B) to ascertain whether or not the authentication server at the first ISP retrieves an IP address from the first ISP user database corresponding to the retrieved customer ID. If not, the customer is currently not online (block 327). The computing device generates an error record indicating that the customer is currently not online and places the generated error record into the verified information table (block 329). The program then terminates.

The affirmative branch from block 323 leads to block 333 where the computing device establishes communication with network management system 153 (FIG. 2). At block 335 (FIG. 3B), the computing device issues a query to the network management system to search for a trial ONU port assigned to the retrieved customer IP address in unverified information table 401 (FIG. 2). At block 337 (FIG. 3C), a test is performed to ascertain whether or not the network management system retrieves a trial ONU port assignment corresponding to the retrieved customer IP address. If not, the computing device generates an error record indicating that the customer is an invalid user and places the generated error record into the verified information table (block 343).

Figure 3C:
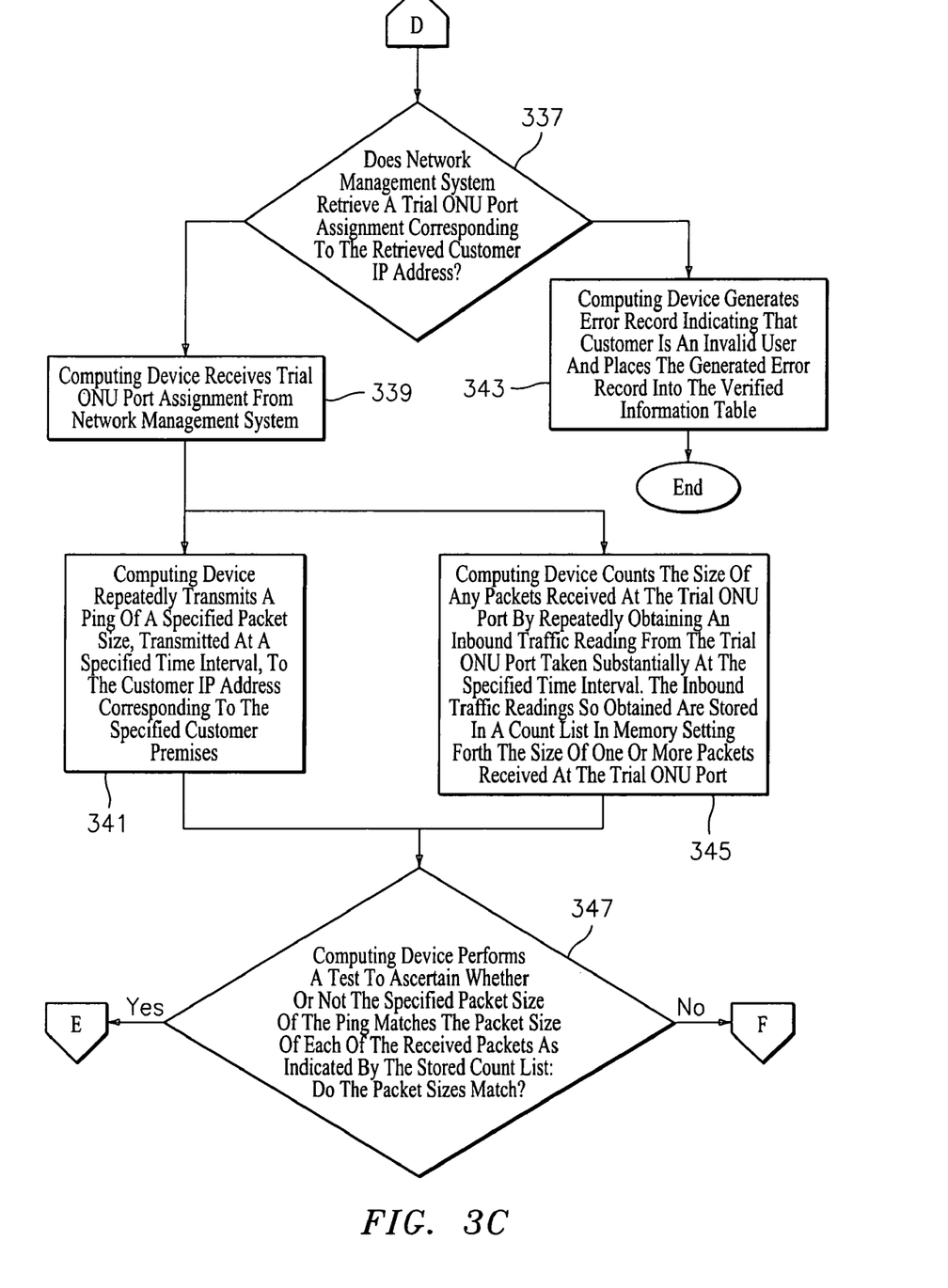

The affirmative branch from block 337 leads to block 339 where the computing device receives a trial ONU port assignment from the network management system. At block 341, the computing device repeatedly transmits a ping of a specified packet size to a customer IP address corresponding to the specified customer premises. This customer IP address was previously determined at block 323. The ping is repeatedly transmitted at a specified time interval. Contemporaneous with the operations of block 341, the operations of block 343 are also performed. At block 343, the computing device counts the size of any packets received at the trial ONU port by repeatedly obtaining an inbound traffic reading from the trial ONU port. The inbound traffic reading is taken substantially at the specified time interval. The inbound traffic readings so obtained are stored in a count list in memory 163 (FIG. 2) setting forth the size of one or more packets received at the trial ONU port.

Next, at block 347 (FIG. 3C), the computing device performs a test to ascertain whether or not the specified packet size of the ping matches the packet size of each of the received packets as indicated by the stored count list. If so, at block 349 (FIG. 3D), the trial ONU port assignment retrieved from the network management system now constitutes a verified ONU port serving the customer premises identified by the customer phone number inputted at block 301. The computing device generates a new customer record in the verified information table, or modifies an existing record in the verified information table. The new or modified record associates at least one of the customer phone number, customer ID, or customer IP address with the verified ONU port (block 351). The program then terminates.

The negative branch from block 347 leads to block 353 (FIG. 3D) where the computing device obtains a port list of provisioned ONU ports from the unverified information table. At block 354, a test is performed to ascertain whether or not there are any provisioned ONU ports remaining to be tested. If not, the program advances to block 367 (FIG. 3E) where the computing device generates a customer record in the verified information table indicating failure to locate an ONU port serving the customer premises identified by the customer phone number inputted at block 301. The program then terminates.

Figure 3D:
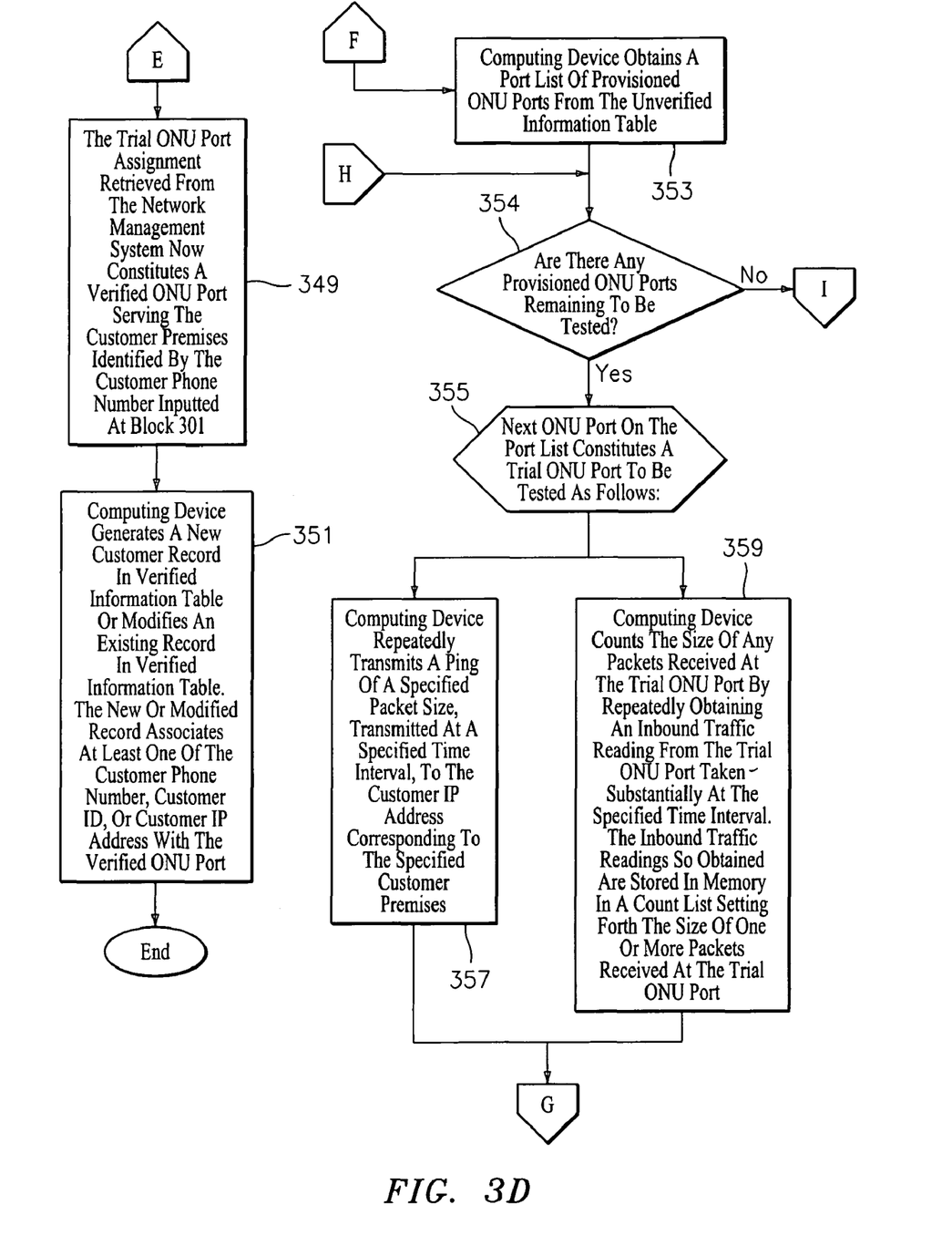
Figure 3E:
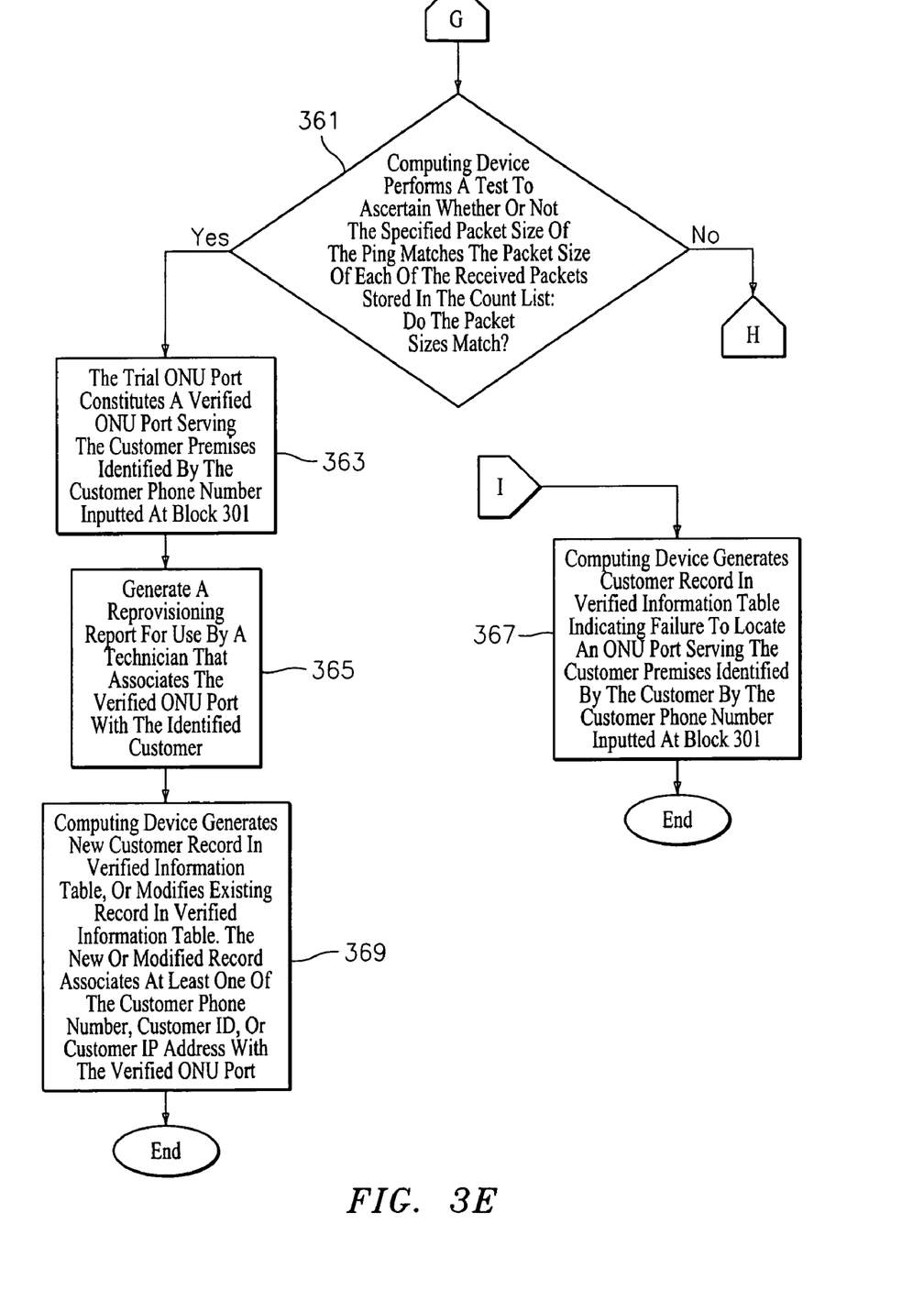

The affirmative branch from block 354 leads to block 355 where the next ONU port on the port list constitutes a trial ONU port to be tested as follows. At block 357, the computing device repeatedly transmits a ping of a specified packet size to a customer IP address corresponding to the specified customer premises. This customer IP address was previously determined at block 323. The ping is repeatedly transmitted at a specified time interval. Contemporaneous with the operations of block 357, the operations of block 359 are also performed. At block 359, the computing device counts the size of any packets received at the trial ONU port by repeatedly obtaining an inbound traffic reading from the trial ONU port. The inbound traffic reading is taken substantially at the specified time interval. The inbound traffic readings so obtained are stored in a count list in memory 163 (FIG. 2) setting forth the size of one or more packets received at the trial ONU port.

Next, at block 361 (FIG. 3E), the computing device performs a test to ascertain whether or not the specified packet size of the ping matches the packet size of each of the received packets as indicated by the stored count list. If so, at block 363, the trial ONU port determined at block 355 now constitutes a verified ONU port serving the customer premises identified by the customer phone number inputted at block 301. The computing device generates a reprovisioning report for use by a technician (block 365). The reprovisioning report associates the verified ONU port with the identified customer. The computing device generates a new customer record in the verified information table, or modifies an existing record in the verified information table. The new or modified record associates at least one of the customer phone number, customer ID, or customer IP address with the verified ONU port (block 369). The program then terminates. The negative branch from block 361 leads to block 354 (described previously).

FIG. 4 is a data structure diagram setting forth an unverified information table 401 for use with the methods of FIGS. 3A-3E. Unverified information table 401 associates a customer ID 403 with a customer phone number 407, a service order number 409, an ONU assignment 411 for the customer, and an unverified ONU port assignment 413 for the customer. Customer ID 403, sometimes referred to as a CLS or as a session ID, identifies a specific customer. Customer ID 403 could, but need not, be implemented using an alphanumeric string. An example of an illustrative customer ID 503 is "70LOXJ551347_SB". ONU port assignment 413 is referred to as an unverified port assignment because the particular ONU port used by a specific customer premises is not always accurately recorded in customer information database 151 (FIG. 2). For example, unverified information table 401 (FIG. 4) may correctly specify that third customer premises 103 (FIG. 2) is using first ONU 134, but this table might erroneously indicate that third customer premises 103 is using third port 123 when, in fact, third customer premises 103 is really using fifth port 125. ONU port assignment 413 could, but need not, be implemented using an alphanumeric string. An example of an illustrative ONU port assignment 413 is "LRVLGAU0095DISCS0212-1-3-1-2". ONU port assignment 413 is obtained from searching a table in network management system 153 (FIGS. 1 and 2). Service order number 409 is an alphanumeric string that was assigned to a customer during the most recent port assignment provisioning. An example of such a string is "C9BF93G".

FIG. 5 is a data structure diagram setting forth a verified information table 501 for use with the methods of FIGS. 3A-3E. Verified information table 501 associates a customer ID 503 with a customer phone number 505, a date 507, a status 509, an ONU assignment 515 for the customer and a verified ONU port assignment 517 for the customer. Customer ID 503, sometimes referred to as a CLS or as a session ID, is used to identify a specific customer. Customer ID 503 could, but need not, be implemented using an alphanumeric string. An example of an illustrative customer ID 503 is "70LOXJ551347_SB". ONU port assignment 517 is referred to as a verified port assignment because use of this port at a specific customer premises has been confirmed by the procedure of FIGS. 3A-3E, and this port assignment is then recorded in verified information table 501. For example, unverified information table 401 (FIG. 4) may correctly specify that third customer premises 103 (FIG. 2) is using first ONU 134, but this table might erroneously indicate that third customer premises 103 is using third port 123 when, in fact, third customer premises 103 is really using fifth port 125. After the procedure of FIGS. 3A-3E is executed, it is determined that third customer premises is using fifth port 125. Accordingly, fifth port 125 is recorded in port assignment 517 field of verified information table 501.

Status 509 is used to store results from one or more ONU port scans pursuant to the procedure of FIGS. 3A-3E. For purposes of illustration, status 509 can take on any of the following values: 1=Verified—Customer is wired to the ONU port indicated in ONU assignment 515 field; 3=Wrong Port—Customer is wired to an ONU port other than that indicated in ONU assignment 515 field; 4=Busy—Customer is online, but the procedure of FIGS. 3A-3E was unable to determine the customer's actual port assignment; 5=Not Online—Customer's device is not connected to the network; 6=No IP—Failure to obtain an IP connection from the Internet service provider; 8=No TID—Failure to obtain an unverified ONU port assignment 413 (FIG. 4) for the customer from network management system 153 (FIGS. 1 and 2); 9=No OMU—Failure to obtain IP for an optical multiplexing unit (OMU) serving the ONU identified by ONU assignment 515 (FIG. 5); 10=No Port—there is no ONU on this OMU; 11="Not IFITL"—Customer is not an IFITL customer; 15=Other—Failure to verify ONU port assignment for another reason not set forth above.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for verifying a customer premises connection to a communication system having a plurality of ports, each of which serves a corresponding customer premises, the method comprising:

using a customer identifier to obtain a customer internet protocol address from an internet service provider database, the existence of the customer internet protocol address indicating that a customer is online;

when the customer internet protocol address exists, transmitting from a computing device a known quantity of data to the customer internet protocol address corresponding to a specific customer premises;

monitoring a quantity of data received at a first trial port of the plurality of ports, the monitoring performed by the computing device monitoring an inbound traffic reading from the first trial port;

if the known quantity of data matches the monitored quantity of data received at the first trial port, then verifying the customer premises connection to the first trial port; and if the known quantity of data does not match the monitored quantity of data received at the first trial port, then monitoring a quantity of data received at a second trial port of the plurality of ports and, if the known quantity of data matches the monitored quantity of data received at the second trial port, then verifying the customer premises connection to the second trial port;

wherein when the customer internet protocol address does not exist in the internet service provider database, generating an error in a verification information table.

2. The method of claim 1, wherein the communication system is an integrated fiber in the loop system having a plurality of optical network unit ports.

3. The method of claim 1 wherein the first trial port is a port that is assigned to the specific customer premises according to information stored in a network management system database.

4. The method of claim 1 wherein, if the customer premises connection to the first trial port is verified, a record is generated and stored in memory for associating the customer premises connection with the first trial port; and if the customer premises connection to the second trial port is verified, a record is generated and stored in memory for associating the customer premises connection with the second trial port.

5. The method of claim 3 wherein, if the customer premises connection to the second trial port is verified, the method further comprises generating a reprovisioning report that associates the customer premises with the second trial port.

6. The method of claim 1 wherein transmitting a known quantity of data is repeatedly performed at a periodic time interval.

7. The method of claim 6 wherein monitoring a quantity of data received is repeatedly performed at the periodic time interval.

8. The method of claim 7 wherein the known quantity of data is transmitted as a ping of a specified packet size, and the ping is transmitted at a specified time interval to the customer internet protocol address corresponding to the specific customer premises.

9. The method of claim 8 further comprising:

monitoring a quantity of data received by measuring size of a plurality of packets received at the first trial port;

wherein, if the specified packet size of the ping matches the size of each of the plurality of packets received by the first trial port, then the customer premises connection to the first trial port is verified; otherwise, monitoring a quantity of data received is performed by measuring size of a plurality of packets received at the second trial port; wherein, if the specified packet size of the ping matches the size of each of the plurality of packets received by the second trial port, then the customer premises connection to the second trial port is verified.

10. A computer program product for establishing a trusted network, the computer program product comprising:

a storage medium readable by a processing circuit and storing instructions for execution by the processing circuit for facilitating a method of verifying a customer premises connection to a communication system having a plurality of ports, each of which serves a corresponding customer premises, the method comprising:

using a customer identifier to obtain a customer internet protocol address from an internet service provider database, the existence of the customer internet protocol address indicating that a customer is online;

when the customer internet protocol address exists, transmitting from a computing device a known quantity of data to the customer internet protocol address corresponding to a specific customer premises;

monitoring a quantity of data received at a first trial port of the plurality of ports, the monitoring performed by the computing device monitoring an inbound traffic reading from the first trial port;

if the known quantity of data matches the monitored quantity of data received at the first trial port, then the first trial port is verified as serving the customer premises; and if the known quantity of data does not match the monitored quantity of data received at the first trial port, then monitoring a quantity of data received at a second trial port of the plurality of ports and, if the known quantity of data matches the monitored quantity of data received at the second trial port, then the second trial port is verified as serving the customer premises;

wherein when the customer internet protocol address does not exist in the internet service provider database, generating an error in a verification information table.

11. The computer program product as recited in claim 10, wherein the communication system is an integrated fiber in the loop system having a plurality of optical network unit ports.

12. The computer program product as recited in claim 10 wherein the first trial port is a port that is assigned to the specific customer premises according to information stored in a network management system database.

13. The computer program product as recited in claim 10 wherein, if the customer premises connection to the first trial port is verified, a record is generated and stored in memory for associating the customer premises connection with the first trial port; and if the customer premises connection to the second trial port is verified, a record is generated and stored in memory for associating the customer premises connection with the second trial port.

14. The computer program product as recited in claim 12 wherein, if the customer premises connection to the second trial port is verified, the method further comprises generating a reprovisioning report that associates the customer premises with the second trial port.

15. The computer program product as recited in claim 10 wherein transmitting a known quantity of data is repeatedly performed at a periodic time interval.

16. The computer program product as recited in claim 15 wherein monitoring a quantity of data received is repeatedly performed at the periodic time interval.

17. The computer program product as recited in claim 16 wherein the known quantity of data is transmitted as a ping of a specified packet size, the ping being transmitted at a specified time interval to the customer internet protocol address corresponding to the specific customer premises.

18. The computer program product as recited in claim 17 wherein monitoring a quantity of data received is performed by measuring size of a plurality of packets received at the first trial port;
wherein, if the specified packet size of the ping matches the size of each of the plurality of packets received by the first trial port, then the customer premises connection to the first trial port is verified; otherwise,
monitoring a quantity of data received is performed by measuring size of a plurality of packets received at the second trial port; wherein, if the specified packet size of the ping matches the size of each of the plurality of packets received by the second trial port, then the customer premises connection to the second trial port is verified.

19. A system for verifying a customer premises connection to a communication system having a plurality of ports, each of which serves a corresponding customer premises, the system comprising:
a computing device using a customer identifier to obtain a customer internet protocol address from an internet servicer provider database, the existence of the customer internet protocol address indicating that a customer is online;
when the customer internet protocol address exists, a transmission mechanism transmitting a known quantity of data to the customer internet protocol address corresponding to a specific customer premises;
a monitoring mechanism for monitoring a quantity of data received at a first trial port of the plurality of ports, the monitoring performed by the computing device monitoring an inbound traffic reading from the first trial port;
a comparison mechanism for comparing the known quantity of data with the monitored quantity of data and, if the known quantity of data matches the monitored quantity of data received at the first trial port, then the customer premises connection to the first trial port is thereby verified;
wherein, if the known quantity of data does not match the monitored quantity of data received at the first trial port, then the monitoring mechanism is capable of monitoring quantity of data received at a second trial port of the plurality of ports and, if the known quantity of data matches the monitored quantity of data received at the second trial port, then the customer premises connection to the second trial port is thereby verified;
wherein when the customer internet protocol address does not exist in the internet service provider database, generating an error in a verification information table.

20. The system of claim 19 wherein the communication system is an integrated fiber in the loop system having a plurality of optical network unit ports.

21. The system of claim 19 wherein the first trial port is a port that is assigned to the specific customer premises according to information stored in a network management system database.

22. The system of claim 19 wherein, if the customer premises connection to the first trial port is verified, a record is generated and stored in memory for associating the customer premises connection with the first trial port; and, if the customer premises connection to the second trial port is verified, a record is generated and stored in memory for associating the customer premises connection with the second trial port.

23. The system of claim 21 wherein, if the customer premises connection to the second trial port is verified, a reprovisioning report is generated that associates the customer premises with the second trial port.

24. The system of claim 19 wherein the transmission mechanism is capable of repeatedly transmitting a known quantity of data at a periodic time interval; and wherein the monitoring mechanism is capable of repeatedly monitoring a quantity of data received at the periodic time interval.

25. The system of claim 24 wherein the transmission mechanism is capable of transmitting the known quantity of data as a ping of a specified packet size, the ping being transmitted at a specified time interval to the customer IP address corresponding to the specific customer premises.

26. The system of claim 25 wherein the monitoring mechanism is capable of measuring size of a plurality of packets received at the first trial port;
wherein, if the specified packet size of the ping matches the size of each of the plurality of packets received by the first trial port, then the customer premises connection to the first trial port is verified;
and the monitoring mechanism is capable of monitoring a quantity of data received at the second trial port by measuring size of a plurality of packets received at the second trial port; wherein, if the specified packet size of the ping matches the size of each of the plurality of packets received by the second trial port, then the customer premises connection to the second trial port is verified.

* * * * *